Nov. 11, 1969  R. H. KRESS ET AL  3,477,547
LUBRICATION MEANS FOR A PLANETARY FINAL DRIVE ASSEMBLY
Filed Sept. 25, 1967  2 Sheets-Sheet 1

INVENTORS
RALPH H. KRESS
JAMES M. KOSTAS
BY
ATTORNEYS

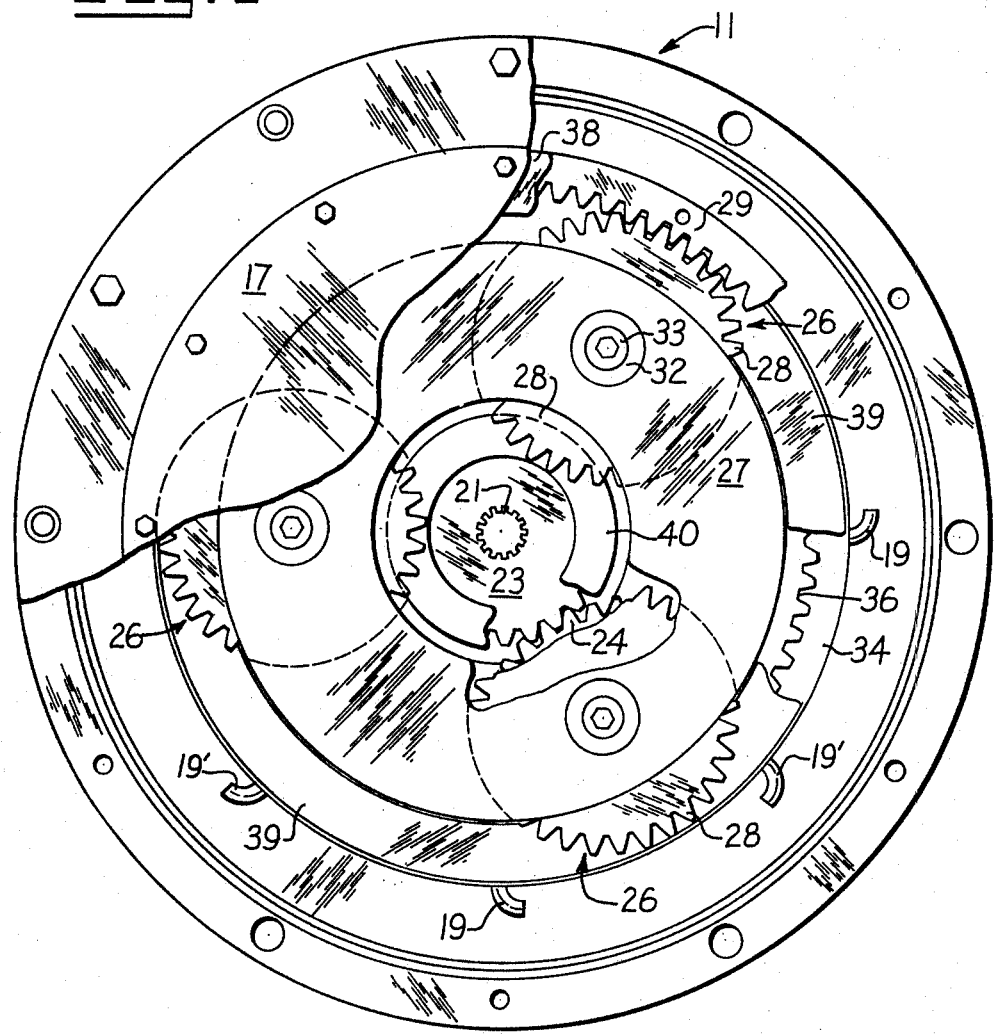

United States Patent Office 3,477,547
Patented Nov. 11, 1969

3,477,547
LUBRICATION MEANS FOR A PLANETARY FINAL DRIVE ASSEMBLY
Ralph H. Kress and James M. Kostas, Peoria, Ill., assignors to Caterpillar Tractor Co., Peoria, Ill., a corporation of California
Filed Sept. 25, 1967, Ser. No. 670,300
Int. Cl. F16n 25/04; B60r 17/34, 17/30
U.S. Cl. 184—63                                    4 Claims

ABSTRACT OF THE DISCLOSURE

A drive assembly for providing hydrostatic power to drive a normally non-driven wheel of a vehicle and thus increase the effective power of the vehicle under adverse conditions comprising a hydraulic motor in the wheel spindle to transfer driving power to the wheel through a planetary gear arrangement disposed in a generally cylindrical housing which rotates with the wheel. To reduce friction between the moving members of the drive assembly and the lubricant in the housing, the amount of lubricant is reduced so that, during higher speed rotation of the wheel, centrifugal force retains the fluid lubricant about the periphery of the gear housing to permit free motion of the gears relative thereto. To insure continuous lubrication of the gears, small angled tubes are mounted on a portion of the planetary gear arrangement for rotation relative to the housing and peripherally disposed lubricant whereupon the tubes collect lubricant from the housing periphery and direct it inwardly upon the gears.

BACKGROUND OF THE INVENTION

Figure 1:
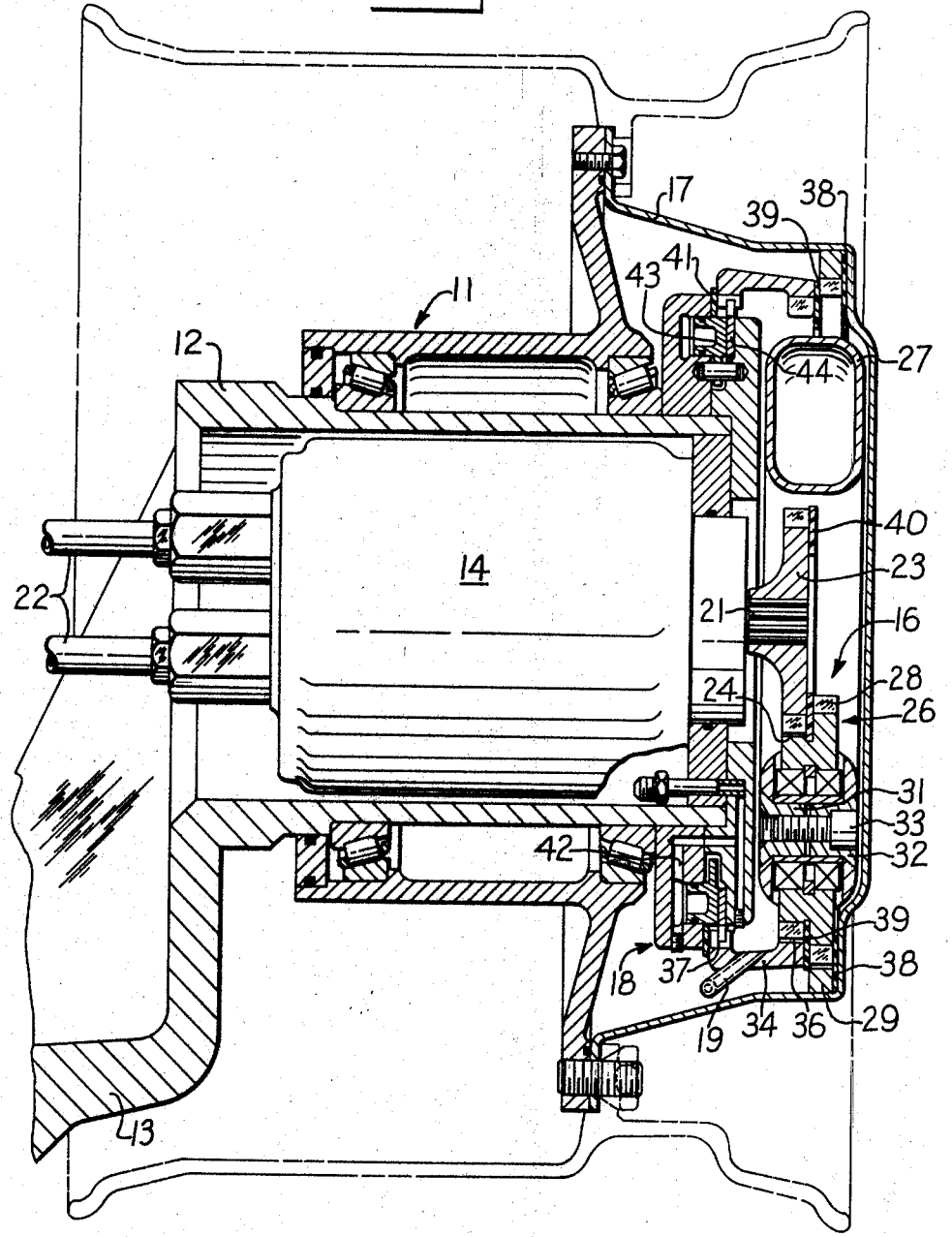

The present invention generally relates to a drive assembly for providing driving power through a gear arrangement to a rotatable member and lubrication means to insure continuous lubrication of the gear arrangement. The utility of the invention is best seen with reference to its use for providing hydraulic power to the normally non-driven steerable wheels of an off-highway truck. Such trucks are operable over wide speed ranges and often encounter adverse conditions where additional traction is desirable. However, the vehicle is commonly limited to low speed operation under these adverse conditions where additional traction would be desirable whereas, under normal operating conditions, it is desirable to operate the vehicle over its entire speed range, employing only the vehicle engine or usual motor means to provide driving power. Thus, it is desirable to provide the truck with an auxiliary power assembly for selectively providing driving power to the normally non-driven steerable wheels of the vehicle. Although such auxiliary power assemblies have been provided for normally non-powered wheels by the prior art, they have not included all of the features which are desirable to permit efficient and reliable operation of the truck. For example, such a drive assembly should be compact and lightweight and provide low speed, high torque power output to the steerable wheels to provide additional traction for the truck under adverse conditions at low speeds. Additionally, friction losses occasioned by the drive assembly are to be minimized particularly in the speed ranges above which the auxiliary drive assembly is operative.

It is an object of the present invention to incorporate these advantages in an auxiliary drive comprising motor means for driving a rotatable member through a gear arrangement disposed in a generally cylindrical housing which rotates with the rotatable members. To reduce friction caused by movement of the gears through a body of lubricating fluids disposed in the gear housing, the quantity of lubricant is so reduced that it tends to be held against the perimeter of the housing by centrifugal force in non-interfering relation with the gears during higher speed rotation of the rotatable member. To insure continuous lubrication of the gears, means are disposed with relation to the gear arrangement and the housing and are operable to receive lubricant from the housing periphery and direct it onto the gears during rotation of the rotatable members.

Other advantages and features of the present invention are made apparent in the following description and the accompanying drawings wherein:

FIG. 1 is a central sectional view through a wheel including the present drive assembly, and FIG. 2 is a side elevation taken from the right side of FIG. 1 with parts broken away to more clearly illustrate the gear arrangement and the lubrication means employed therein.

Referring particularly to FIG. 1, a steerable vehicle wheel is illustrated as having a hub 11 mounted for rotation on a hollow spindle 12 which is connected to the vehicle (not shown) by supporting structure 13. A drive assembly for selectively providing auxiliary driving power to the wheel hub comprises motor means, preferably a hydraulic motor 14, which is mounted within the hollow spindle. A planetary gear assembly 16, in the housing 17 transmits rotation from the motor to the wheel.

Clutch means 18 are included to permit free rotation of the gear assembly and reduce friction loss within the wheel when the motor 14 is not being employed to drive the wheel.

To further reduce friction losses in the wheel particularly during higher speed operation, fluid lubricant for the gear assembly is disposed within the gear housing 17 in limited quantities so that, during high speed rotation of the hub and accordingly of the housing, centrifugal forces tend to retain the fluid lubricant in the area adjacent the periphery of the gear housing. Thus, friction loss due to movement of the gear assembly through the fluid lubricant body, which losses would be particularly significant at higher rotational speeds, are greatly reduced by the employment of a limited quantity of lubricant. However, while retention of the lubricant in the periphery of the housing would permit relatively free motion of the gears, the lubricant would also be retained in non-lubricating relation to the gear assembly. To insure continuous lubrication of the gear assembly, lubrication means 19 are disposed with relation to the gear assembly and the gear housing 17 to collect fluid lubricant from the periphery of the housing during rotation of the wheel and direct it inwardly upon the gear assembly to provide lubrication for its bearing surfaces.

To describe the auxiliary power drive for the wheel in greater detail, the hydraulic motor 14 has a shaft 21 which is rotated by fluid flowing through lines 22 associated with the motor. A sun gear 23 is secured upon the motor shaft in driving relation to an inner gear 24 on each of three planet gears 26 (see also FIG. 2). The planet gears are circumferentially spaced within a floating carrier 27 with each planet gear having an outer gear 28 of larger pitch diameter than the inner planet gears 24 to impart rotational driving force to the wheel hub through a ring gear 29 which is secured to the gear housing and meshes with the outer planet gear 28. Each planet gear assembly 26 is held within the carrier by two tapered end shafts 31 and 32 with a countersunk bolt 33 in threaded engagement therebetween. The position of the floating carrier is determined by the gear housing and a ring gear 34 which has an outer gear 36 meshing with the inner gear 24 of each planet gear assembly. The ring gear 34 also has an inner gear 37 which cooperates with the clutch 18 in the manner described below.

End play encountered from the floating carrier is controlled by the use of four thrust bearing rings 38, 39, 40 and 41, which are manufactured of a suitable bearing material. The thrust ring 38 is retained between the ring gear 29 and the gear housing 17 to contact and locate the outer gear 28 of each planet gear assembly. The thrust ring 39 is located around the outside of the three planet gear assemblies and is further positioned between their inner and outer gears 24 and 28 respectively. The thrust ring 39 extends outwardly to provide contact and relative placement between each outer planet gear 28 and the ring gear 34. The third thrust ring 40 is disposed inside of the three planetary gear assemblies and is secured between the inner and outer planet gears to provide for interaction between the sun gear and each outer planet gear 28. The fourth thrust ring 41 is disposed between the ring gear 34 and the housing of the clutch assembly 18 to provide for interaction between the inner ring gear section 37 and the stationary clutch housing.

When the motor 14 is to drive the wheel, hydraulic fluid employed to operate the motor is communicated simultaneously through a passage 42 to act against a clutch piston 43 in the clutch assembly 18. The clutch piston is forced into engagement with a clutch plate 44 by hydraulic pressure in the passage 42 whereupon the clutch plate is caused to be clamped between the reaction face of piston 43 and the stationary clutch reaction plate for grounding and stopping of all rotation in the ring gear 34. The circular clutch plate 44 is in splined relation with the inner ring gear section 37 and turns freely with the ring gear 34 when the clutch 18 is not actuated.

In operation, when the sun gear is rotated by hydraulic fluid provided to the motor and then the ring gear 34 is grounded by the clutch, the planet gears are rotated by the sun gear and the carrier is forced to rotate so that the wheel hub is rotated by the interaction of its ring gear 29 and the outer planet gears 28. When auxiliary drive by the motor 14 is to be terminated, conventional controls (not shown) drain the clutch actuating fluid from the passage 42 and cause the output shaft 21 of the motor to be held stationary so that the sun gear is locked in a fixed position. Release of actuating fluid in the clutch frees the ring gear 34 for rotation so that the entire assembly rotates freely with the ring gear 34 rotating slightly slower than the housing.

To provide for lubrication of the gear assembly, fluid lubricant is disposed in the gear housing in sufficiently limited quantity so that, during higher speed rotation of the wheel, centrifugal force retains the lubricant about the periphery of the gear housing and friction losses which would result from movement of the gear components through the lubricant are substantially eliminated.

However, with the lubricant retained out of contact with the gear assembly during the rotation of the wheel, the lubricant would also be in non-lubricating relation with the gear. To provide for continuous lubrication, the lubrication means 19 are preferably a plurality of small angled tubes which are circumferentially spaced about the ring gear 34 and which penetrate to the interior of the ring gear. The outer end of each tube curves away from the direction in which the gear housing travels relative to the ring gear. For purposes of an example, the vehicle employing the present wheel is designed to employ the auxiliary drive from the motor 14 over a speed range from zero to 14.2 miles per hour, while the vehicular engine drives the vehicle at substantially greater speeds without assistance of the auxiliary power drive described herein. During a vehicular speed range of approximately 0 to 7 miles per hour, the presence of the lubricating tubes 19 is not important since the centrifugal force is not great enough to hold the oil around the periphery of the housing and the gear components well lubricated. In the speed range from 7 to 14.2 miles per hour, the centrifugal force is sufficient to hold the oil in non-lubricating relation with the gear assembly. Lubrication for the gear assembly is additionally important during this speed range since auxiliary power may be exerted therethrough upon the wheel. During operation of the motor 14, the clutch 18 is engaged to lock the ring gear 34 in place with the wheel hub and gear housing rotating thereabout at approximately 111 revolutions per minute when the vehicular speed is 14.2 miles per hour. Motion of the gear housing relative to the locked ring gear carrying the tubes 19 causes a substantial flow of lubricant into the tubes which is jetted forceably onto the gear component.

Some lubrication is also desirable for the freely rotating gear arrangement when the vehicle is traveling at speeds greater than 14.2 miles per hour and auxiliary power is not being employed. As noted above, the ring gear 34 is then traveling in the same direction and slightly slower than the gear housing, for example at a ratio of .975 to 1, so that adequate lubrication is also provided during this period.

Thus, the present invention provides a lightweight auxiliary power drive which has a minimum rotating mass at high vehicle speeds. The present auxiliary power drive also substantially reduces friction losses occurring during rotation of the wheel when the power drive is not being employed, because of the limited quantity of lubricant as well as employment of a clutch therein. Still further, the present invention provides a power drive capable of receiving a high speed power input and delivering low speed, high torque output which could be employed in many other applications. For example, it could be employed in normally unpowered wheels of other vehicles or for driving the elevator of a self-loading scraper. It is also apparent that the lubrication means 19 could be altered to provide for concentration of lubricant on particular gear portions or to vary the amount of lubricant to be provided.

To further provide for adequate lubrication of the drive assembly during high speed reverse operation and interchangeability of parts between wheels on the right and left sides of a vehicle, an additional set of lubricating tubes, partly indicated at 19' are disposed on the periphery of the ring gear 34. The tubes 19' are similar to the lubricating tubes 19 except that their outer ends curve in an opposite direction. Thus, the tubes 19' provide lubrication in the manner described above with respect to tubes 19 when the vehicle wheel illustrated in the drawing is to rotate in the opposite direction.

We claim:
1. In a drive assembly having motor means for driving a rotatable member through a planetary gear arrangement disposed in a generally cylindrical housing which rotates with the rotatable member, the planetary gear arrangement having a ring gear rotatable at a differential speed relative to the housing, the improvement comprising,
   a body of fluid for lubrication of the gear arrangement being contained in the gear housing in sufficiently small quantity to substantially reduce friction resulting from movement of the gears through the lubricant body, the lubricant tending to be held by centrifugal force against the perimeter of the cylindrical housing in non-lubricating relation to the gears during higher speed rotation of the rotatable member, and
   a plurality of tubes disposed outwardly of the ring gear member in circumferentially spaced relation with their inner ends penetrating the ring gear member and being directed toward the gears to be lubricated, said tubes having their outer ends disposed generally adjacent the housing and directed counter to the direction of rotation from the housing to receive lubricant from the housing periphery and direct it onto the gears.

2. The drive assembly of claim 1 comprising an additional plurality of lubrication tubes which are similar to said plurality of tubes except that their outer ends are oppositely directed to provide lubrication when the rotatable member is to rotate in an opposite direction.

3. The drive assembly of claim 2 employed as an auxiliary drive for providing increased traction in vehicles where the rotatable member is a normally non-driven wheel mounted for rotation on a spindle of the vehicle.

4. The drive assembly of claim 1 further comprising a clutch associated with the planetary gear assembly, said clutch being selectively operable to disengage the gear assembly and permit free rotation of the gears.

References Cited

UNITED STATES PATENTS

| | | | |
|---|---|---|---|
| 1,278,940 | 9/1918 | Kollmann | 184—13 |
| 2,516,200 | 7/1950 | Geyer | 184—60 |
| 3,065,822 | 11/1962 | McAfee et al. | 184—60 |
| 3,160,026 | 12/1964 | Rosen | 74—801 X |
| 3,184,994 | 5/1965 | Stahl. | |
| 3,217,826 | 11/1965 | Carter et al. | |

FOREIGN PATENTS 374,655   4/1923   Germany.

HALL C. COE, Primary Examiner

U.S. Cl. X.R.

180—43; 184—6